Jan. 17, 1956 R. T. CLAYDEN 2,731,557

NONLINEAR ELECTRICAL CONTROL CIRCUITS

Filed July 19, 1950 2 Sheets-Sheet 1

Inventor
RONALD THOMAS CLAYDEN
By Ralph E. Atherton
Attorney

Jan. 17, 1956 R. T. CLAYDEN 2,731,557

NONLINEAR ELECTRICAL CONTROL CIRCUITS

Filed July 19, 1950 2 Sheets-Sheet 2

Inventor
RONALD THOMAS CLAYDEN
By Ralph E. Atherton
Attorney

1

2,731,557

NONLINEAR ELECTRICAL CONTROL CIRCUITS

Ronald Thomas Clayden, East Sheen, London, England, assignor to Electric & Musical Industries Limited, Hayes, Middlesex, England, a company of Great Britain Application July 19, 1950, Serial No. 174,605

Claims priority, application Great Britain July 21, 1949

12 Claims. (Cl. 250—27)

Figures 1, 2, 3:
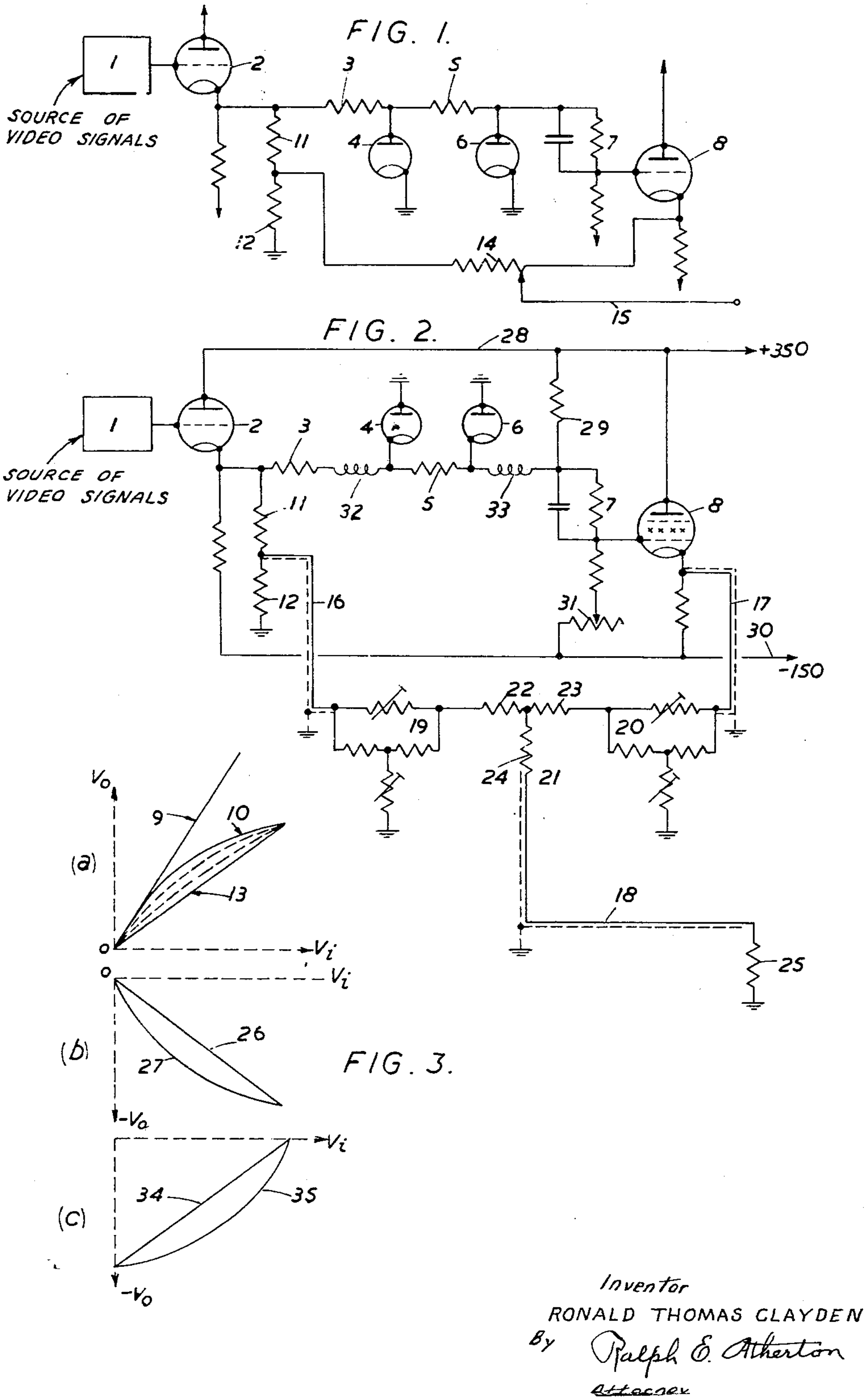

This invention relates to electrical control circuits of the kind wherein on the application of signals to said circuit signals can be derived whose amplitude or instantaneous level is related in a non-rectilinear manner to the instantaneous level of the applied signals.

Control circuits of this kind are frequently required in television transmitting apparatus for effecting so-called "gamma" correction, or contrast control, of video signals. It is usually desirable to derive signals whose instantaneous level ($V_0$) is related to the instantaneous level of applied video signals ($V_1$) in accordance with a characteristic which can be expressed approximately by the law.

$$v_0 = kv_1\gamma$$

In a practical case the value of $\gamma$ obtainable from a given circuit may be ⅓. However it is frequently desirable to vary the characteristic and in particular to increase $\gamma$ towards unity when for example the mean brightness content of the television signals decreases. In a known form of "gamma" correcting circuit, the signals to be corrected are applied between anode and cathode of a valve arranged to operate over a nonlinear portion of its characteristic and to enable the value of $\gamma$ to be increased towards unity it has been proposed either to reduce the range of variation of the signals applied to the circuit so as to use a smaller part of the characteristic or alternatively to lower the D. C. level of the applied signals so as to "slide" the signals to a less curved part of the characteristic. Both these proposals have however, the disadvantage that when only a part of the characteristic is utilised the relationship between the applied and derived signals does not approximate as closely as desired to the aforesaid law. Another disadvantage is that the effective gain of the circuit is altered, while the adoption of the latter alternative involves alteration of the D. C. level of the derived signals which is undesirable.

Similar difficulties may arise with other "gamma" control circuits and an object of the present invention is to provide an improved electrical control circuit such as is suitable for use for "gamma" control in television equipment, with a view to mitigating the difficulties aforesaid.

A further object of the present invention is to provide an electrical control circuit comprising means for setting up at one point in said circuit signals whose amplitude or instantaneous level is related to the amplitude or instantaneous level of signals applied to said circuit in accordance with a characteristic of one curvature, and at another point in said circuit signals whose amplitude or instantaneous level is related to the amplitude or instantaneous level of signals applied to said circuit in accordance with a characteristic having a different curvature, and means for feeding a fraction of the signals set up at said points in like phase to an output channel, said last-mentioned means being adjustable in such manner as to cause the fraction of the respective sets of signals fed

2 from said points to be varied inversely one with respect to the other.

It is to be understood that one of the characteristics referred to in the preceding paragraph may be rectilinear.

Figure 4:
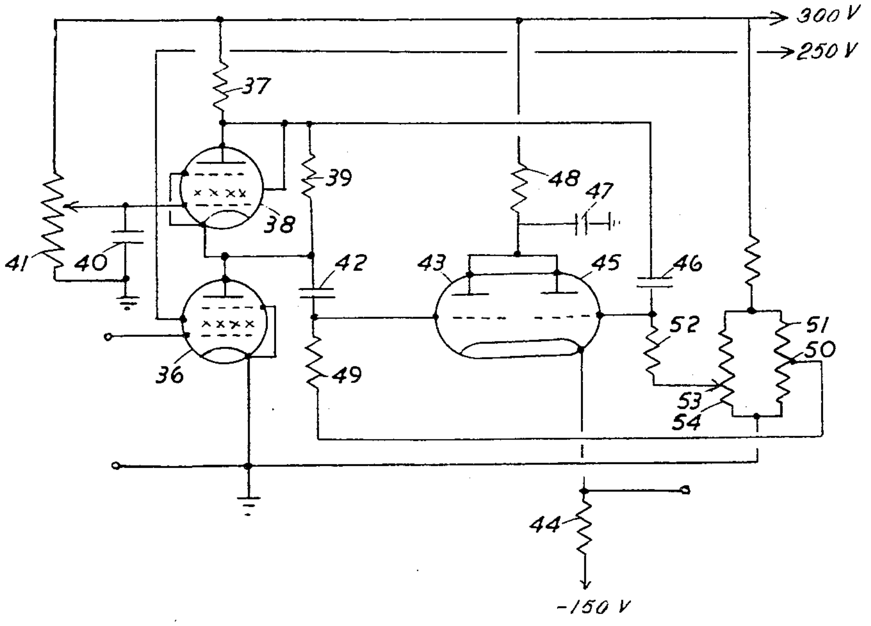

In order that the said invention may be clearly understood and readily carried into effect, the same will now be more fully described with reference to the accompanying drawings in which:

Figure 1 illustrates a simplified form of electrical control circuit in accordance with one example of the present invention, Figure 2 illustrates a practical application of the circuit illustrated in Figure 1, Figure 3 comprises waveforms explanatory of Figures 1 and 2, and Figure 4 illustrates another form of electrical control circuit in accordance with the present invention.

Referring to the drawings, it will be assumed that the circuits illustrated in Figures 1 and 2 are utilised for varying the $\gamma$ or contrast of television video signals, the said signals being applied from a source illustrated in block form at 1 the source being for example the head amplifier of television transmitting equipment. The video signals from the source 1 are fed by means of a cathode follower valve 2 to a non-linear potential attenuator comprising resistance 3 in series with a diode valve 4. Signals appearing at the junction of the resistance 3 and the diode 4 are fed to a further non-linear potential attenuator comprising a resistance 5 and a diode valve 6, the signals appearing at the junction of 5 and 6 being in turn fed by means of a D. C. coupling circuit 7 to a further cathode follower valve 8. The signals from the source 1 are fed to the valve 2 with a constant peak level and so that a positive excursion represents an incerase in picture brightness, the signals having such a D. C. level that picture black is represented by a signal of 0 volts on the cathodes of the valves 2 and 8. The circuit is such that the cathode follower valve 2 feeds an impedance several times the reciprocal of its mutual conductance, so that the valve operates substantially linearly. Therefore the instantaneous level of the signals set up at the cathode of the valve 2 is related to the instantaneous level of the signals from the source 1 in accordance with the substantially rectilinear characteristic such as indicated at 9 in Figure 3*a*. However, the action of the non-linear potential attenuators 3, 4 and 5, 6 is to cause the instantaneous level set up at the cathode of the valve 8 to be related to the instantaneous level of the signals from the source 1 substantially in accordance with the characteristic 10 in Figure 3*a* representing a value of $\gamma$ of the order of 1/3.

In addition to being applied to the aforesaid non-linear attenuators, signals set up at the cathode of the valve 2 are also applied across a linear attenuator comprising resistances 11 and 12 which have such values that signals set up at the junction of 11 and 12 have a maximum voltage swing equal to the maximum voltage swing of the signals set up at the cathode of the valve 8. The instantaneous level of the signals at the junction of 11 and 12 is therefore related to the instantaneous level of the signals from the source 1 by the characteristic 13 (Figure 3*a*). This characteristic is rectilinear, representing a value of $\gamma$ equal to unity. It is apparent in Figure 3*a* that the attenutors 3, 4 and 5, 6 and the valve 8 constitute a network which is responsive over the maximum voltage swing of the signals fed to the valve 2, that is over the whole range of video signals from peak black to peak white. The resistances 11 and 12 are of course also responsive over the whole range of video signals from peak black to peak white. The junction of 11 and 12 and the cathode of the valve 8 are interconnected by a potentiometer 14 and the output of the circuit is taken by the lead 15 from the tap on the potentiometer 14. The tap is shown at the right-hand end of the potentiometer 14 and therefore the signals at the cathode of the valve 8 are fed to the lead 15 substantially without modification. On moving the tap on the potentiometer 14 to the left an increasingly smaller fraction of the signals at the cathode of the valve 8 is fed to the lead 15 whilst a proportionally increasing fraction of the signals set up at the junction of 11 and 12 is fed to the lead 15 and added to the former signals. Since the signals are in like phase and have equal maximum voltage swings, by adjusting the potentiometer 14 is is possible to obtain from the lead 15 signals whose instantaneous level is related to the instantaneous level of the signals from the source 1 by different characteristics between and including the characteristics 10 and 13, two characteristics between 10 and 13 being indicated by the dotted lines in Figure 3*a*, such characteristics being good approximations to the desired law above referred to. Moreover when the circuit is set up for a given maximum signal swing at the cathode of the valve 2, the maximum signal swing in the output of the circuit is constant irrespective of the adjustment of the potentiometer 14 and the D. C. level of the signal output is also constant irrespective of such adjustment.

In practical applications of the circuit illustrated in Figure 1 it is usually necessary for the means for adjusting the characteristic of the circuit to be disposed at a position remote from the valve circuits, so that a simple potentiometer such as 14 cannot be used. Figure 2 illustrates a practical application in which remote adjustment of the characteristics can be effected and according thereto the signals set up at the junction of the resistances 11 and 12 are fed to the control point by a low impedance cable 16 of say 75 ohms, the resistances 11 and 12 being chosen to give an output impedance at their junction to match the cable. Similarly the signals set up at the cathode of the valve 8 are fed to a further low impedance cable 17, also of 75 ohms. The cables 16 and 17 feed their outputs to an output cable 18 via bridged T potential attenuators 19 and 20 each of 75 ohms resistance and a T matching section 21 comprising resistances 22, 23 and 24 each of 25 ohms. The adjustable elements in the attenuators 19 and 20 are ganged on a single control shaft in such a way that on adjusting the shaft the attenuation effected by one of the attenuators is reduced whilst that effected by the other is proportionally increased. The cable 18 feeds the output of the circuit to subsequent stages of the equipment represented in Figure 2 by a resistance 25 of 75 ohms. In a practical case, the signals fed to the control electrode of the valve 8 may have a voltage swing of about 1.5 volts and since the output from the cathode of the valve 8 is fed to a low impedance circuit the valve 8 may introduce appreciable curvature in the signals fed to the cable 17. Such curvature would be of the opposite sense to that introduced by the non-linear attenuators 3, 4 and 5, 6 if the diodes 4 and 6 are connected with the polarity shown in Figure 1. In Figure 2, the diodes 4 and 6 are therefore reversed in polarity as shown and the signals are fed from the source 1 with such polarity that an increase in picture brightness is represented by a negative excursion, picture black being again represented by a signal of zero volts at the cathodes of valves 2 and 8. Any curvature introduced by the valve 8 is therefore in the same sense as that introduced by the attenuators 3, 4 and 5, 6 and serves merely to decrease slightly the value of $\gamma$ which would otherwise be obtained. The gamma characteristics pertaining to the instantaneous level of the signals set up at the junction of 11 and 12 and at the cathode of the valve 8 respectively are therefore inverted compared with the characteristics 10 and 13 of Figure 3*a*, the corresponding characteristics being illustrated at 26 and 27 respectively in Figure 3*b*.

In Figure 2, the cathode of the diode 6 is connected to the positive potential source of the apparatus, indicated by the line 28, by a bleeder resistance 29 which serves to apply appropriate bias to the diodes 4 and 6. The grid leak resistance of the valve 8 is taken as shown to the negative potential source 30 of the apparatus via a variable resistance 31. Inductances 32 and 33 are provided as shown to improve the frequency response characteristic of the circuit. If a characteristic less closely approximating than 26 to the desired logarithmic law can be tolerated then one of the non-linear attenuators (e. g. the attenuator 5, 6) may be dispensed with, in that case the characteristic at the cathode of the valve 8 being the sum of the curvatures introduced by the attenuator 3, 4 and by the valve 8. With the circuit illustrated in Figure 4 the signals obtained from the cable 18 are subsequently inverted before their being fed to the output stage of the equipment.

The circuit illustrated in Figure 2 can also be utilized for producing positive gamma characteristics, i. e. characteristics corresponding to values of $\gamma$ greater than unity, by inverting the signals from the source 1 and not inverting the signals from the output cable 18. In this case the signals from the source 1 have their D. C. component established in such a way that picture white is represented by zero volts at the cathode of the valve 2, whilst a decrease in picture brightness is represented by a negative excursion. The gamma characteristics of the signals at the junction of 11 and 12 and at the cathode of the valve 8 would be represented by the characteristics such as 34 and 35 in Figure 3(*c*). A positive gamma characteristic is sometimes required in apparatus for scanning cinematograph film for the purpose of producing television signals when, for example, negative film is scanned to produce positive television signals. Moreover by providing, before and after the contrast control circuit, phase reversing stages which can be switched into and out of circuit as desired it is possible to provide for contrast control over a range of characteristics representing values of $\gamma$ from less than 1 to greater than 1, such control being especially advantageous in film scanning apparatus to enable positive or negative film to be scanned, a value of $\gamma$ less than 1 being in general required for scanning positive film and greater than 1 for scanning negative film. In such a case the attenuators 19 and 20 (Figure 2) can, advantageously, be controlled by a single rotary multiple-position switch adapted on rotation to successive positions to change the value of $\gamma$ from its minimum to its maximum, or vice versa, the switch being also arranged to operate relays by means of auxiliary contacts on passing the position representing a value of $\gamma$ equal to 1, whereby the phase reversing stages are switched into or out of circuit as may be appropriate. For instance a rotary switch having 10 positions could be employed in which case the switch would be arranged to give at 4 positions values of $\gamma$ less than unity, to give at 4 other positions values greater than unity, and in two intermediate positions to give the values of $\gamma$ equal to unity.

Referring to Figure 4, the circuit therein illustrated comprises an amplifying valve 36 which is shown as a pentode and has an anode load comprising a resistance 37 connected in series with the parallel combination of a thermionic valve 38 and a resistance 39. The television signals, the gamma of which is to be controlled, are fed to the control electrode of the valve 36 with such polarity that the increase in picture brightness is represented by a positive potential excursion at the control electrode. The control electrode of the valve 38 is connected to ground by a condenser 40 for alternating current and to the tap on a potentiometer 41 for biassing purposes. Other electrodes of the valves 36 and 38 are suitably polarized as indicated. The anode of the valve 36 is connected by a blocking condenser 42 to the control electrode of a valve 43 whose cathode is coupled by means of a resistance 44 to the cathode of a further valve 45 similar to the valve 43. The control electrode of the valve 45 is connected by a blocking condenser 46 to the junction of the resistances 37 and 39 while the anodes of the valves 43 and 45 are together connected to ground for alternating current by a condenser 47 and to a source of polarizing potential via a resistance 48. The control electrode of the valve 43 is connected by a leak resistance 49 to a fixed tap 50 on a resistance 51 while the control electrode of the valve 45 is connected by a leak resistance 52 to a sliding tap 53 on the potentiometer 54. Resistance 51 and potentiometer 54 are connected in parallel between a positive potential source and ground as shown so that the bias applied to the control electrodes of the valves 43 and 45 is determined by the positions of the taps 50 and 53.

In operation of the circuit illustrated in Figure 4 the valve 36 operates as a current amplifier feeding current variations to its anode load which are effectively linearly related to the input signals applied to its control electrode. The bias applied to the control electrode of the valve 38 is such as to cause it to operate over the curved part of its cathode current mutual conductance characteristic so that it functions as a non-linear impedance. Since the anode current of the valve 36 divides between the valve 38 and the resistance 39 the current variations in the latter resistance are consequently curvilinearly related to the signals applied to the input signals, and the gamma characteristic pertaining to the signals set up at the anode of the valve 36 is arranged to be of the form indicated by the characteristic 27, Figure 3(*b*). On the other hand, the whole of the anode current of the valve 36 traverses the resistance 37 so that the signals set up at the junction of 37 and 39 have a gamma characteristic corresponding to a value of gamma equal to unity, that is corresponding to the curve 26 in Figure 3. The signals at the anode of the valve 36 control the space current in the valve 43 while the signals at the junction of 37 and 39 control the space current in the valve 45 and the space currents in these valves can be caused to vary inversely one of the other by adjustment of the tap 53. The signal output of the circuit is taken from the cathode resistance 44 and it will be appreciated that the gamma characteristic of the output signals is dependent upon the position of the tapping 53 and by adjustment of the tapping can be varied through a range of values of gamma between and including the values represented by the curves 26 and 27 in Figure 3(*b*), curve 27 being obtained when the tapping 53 is moved towards the low potential end of the potentiometer 54 until the valve 45 is cut off. Conversely the characteristic 26 is obtained when the tap 53 is moved to cut off the valve 43.

The invention may also be applied to circuits in which, instead of setting up two characteristics one of which is rectilinear and the other of which is curvilinear, two characteristics are set up one of which represents a value of gamma less than unity and the other of which represents a value of gamma greater than unity. In this case it would be possible for the signal output to have a gamma characteristic corresponding to a value of gamma either greater or less than unity, between and including the limiting values determined by the characteristics set up.

What I claim:

1. A nonlinear electrical control circuit comprising first means for deriving, from applied signals, signals with an instantaneous level related to the instantaneous level of the applied signals in accordance with one characteristic, second means for deriving, from the applied signals, signals with an instantaneous level related to the instantaneous level of the applied signals in accordance with a different characteristic, one at least of said characteristics being curved, an output channel, a bridged T potential attenuator for feeding signals from said first means to said channel, and a second bridged T potential attenuator for feeding signals derived from said second means to said channel, whereby output signals are set up across said load with an instantaneous level related to that of the input signals in accordance with a nonlinear characteristic having a curvature adjustable between said first and second curvatures by adjustment of said attenuators.

2. A contrast control circuit for television video signals, comprising a source of video signals, a nonlinear device for deriving voltages with an instantaneous level nonlinearly related to the instantaneous level of voltages applied to said device, a linear device for deriving voltages with an instantaneous level substantially linearly related to the instantaneous level of voltages applied to said linear device, low impedance driving means for applying voltage variations related to the video signals from said source to said nonlinear device and said linear device in parallel, said devices being dimensioned to produce the same potential difference between derived voltages representative of peak black and peak white video signals, and adjustable means for combining the voltages derived from said devices to produce output voltage variations with an instantaneous level related to that of the video signals by a nonlinear law adjustable by adjustment of said means.

3. A nonlinear electrical control circuit comprising the series combination of two impedances, one at least of said impedances being nonlinear, high impedance driving means for applying current variations related to input signals to said impedances in series, and adjustable means for combining voltages derived from the respective impedances to produce output variations with an instantaneous level related to that of the input signals by a nonlinear law adjustable by adjustment of said means.

4. A contrast control circuit for television video signals, comprising a source of video signals, the series combination of a nonlinear device, and a linear device, high impedance driving means for applying current variations related to the video signals from said source to said nonlinear device and said linear device in series, said devices being dimensioned to produce the same potential difference between derived voltages representative of peak black and peak white video signals, and means for combining complementary fractions of voltages derived from said devices to produce output voltage variations with an instantaneous level related to that of the video signals by a nonlinear law adjustable by adjustment of said means, and with the aforesaid potential difference between voltages representative of peak black and peak white video signals.

5. A contrast control circuit according to claim 4, said nonlinear device comprising the parallel combination of a thermionic valve and a linear resistance, and means for biasing said valve to operate nonlinearly.

6. A nonlinear electrical control circuit comprising first means for deriving, from applied signals, signals whose instantaneous level is related to the instantaneous level of the applied signals in accordance with one characteristic, second means for deriving, from applied signals, signals whose instantaneous level is related to the instantaneous level of the applied signals in accordance with another characteristic, one at least of said characteristics being nonlinear, two thermionic valves each having at least an anode, a control electrode and a cathode, means for feeding signals derived from said first means to the control electrode of one of said valves, means for feeding signals derived from said second means to the control electrode of the other valve, an impedance coupling said valves at their cathodes, means for biassing said valves at their control electrodes, the biassing means for one of said valves being adjustable, whereby an output of signals can be derived from said impedance with an instantaneous level related to the instantaneous level of the input signals in accordance with a characteristic adjustable between said different characteristics.

7. A contrast control circuit for television video signals comprising a source of video signals to be nonlinearly modified, a nonlinear impedance responsive over the whole range of the video signals from said source for setting up an output of signals nonlinearly related to the video signals from said source, a linear impedance responsive over the whole range of the video signals from said source for setting up an output of signal linearly related to the video signals from said source, and unicontrol means for combining the two outputs of signals in adjustable proportions to produce an output of signals adjustably nonlinearly related to the signals from said source.

8. A nonlinear electrical control circuit comprising a thermionic valve having at least an anode, a control electrode and a cathode, a cathode circuit for said valve comprising two parallel impedance arms at least one of which includes a nonlinear impedance, an output channel, attenuating means connected from an intermediate point in one of said arms to a point in said output channel, and connected from an intermediate point in the other of said arms to the same point in said output channel, said attenuating means being adjustable to set up an output of signals in said channel adjustably nonlinearly related to signals applied to said control electrode.

9. A nonlinear electrical control circuit comprising a thermionic valve having at least an anode, a control electrode and a cathode, a cathode circuit for said valve comprising two parallel impedance arms, one of said arms comprising the series combination of two linear impedances, and the other of said arms comprising the series combination of a linear impedance and a nonlinear impedance, a further thermionic valve having at least an anode, a control electrode and a cathode with the control electrode connected to the junction of the linear impedance and the nonlinear impedance in said second arm, an impedance in the cathode lead of said further valve, an output channel, and means for feeding adjustable complementary fractions of the voltages set up at the junction of said impedances in said first arm and at the cathode of said further valve to said output channel.

10. A nonlinear electrical control circuit comprising a thermionic valve having at least an anode, a control electrode and a cathode, an anode circuit for said valve comprising a series combination of a nonlinear impedance and a linear impedance, circuit connections for said valve causing it to operate with an output impedance at its anode high compared with the impedance of said series combination, and adjustable means for combining voltages set up across said linear impedance with voltages set up across said nonlinear impedance in different proportions to produce an output of signals adjustably nonlinearly related to signals applied to the control electrode of said valve.

11. A nonlinear electrical control circuit comprising a source of signals, means for deriving from the signals from said source one set of signals whose instantaneous level is related to the instantaneous level of the signals from said source in accordance with one characteristic, means for deriving from the signals from said source a second set of signals whose instantaneous level is related to the instantaneous level of the signals from said source in accordance with another characteristic, one at least of said characteristics being nonlinear, and a potential divider having one end connected to the output point of said first means, having its other end connected to the output point of said second means, and having a tap movable between said ends for deriving an output of signals adjustably nonlinearly related to the signals from said source.

12. A nonlinear electrical control circuit comprising a source of signals, a first impedance, means for setting up across said first impedance signals related to signals from said source according to one characteristic, a second impedance, means for setting up across said second impedance signals related to signals from said source according to a different characteristic, one at least of said characteristics being nonlinear, and control means connected to a fixed output point on said first impedance to receive a first input of signals therefrom and connected to a fixed output point on said second impedance to receive a second input of signals therefrom, said control means being adjustable to combine said two inputs in adjustable proportions to produce an output of signals adjustably nonlinearly related to the signals from said source.

References Cited in the file of this patent

UNITED STATES PATENTS

| | | |
|---|---|---|
| 2,248,563 | Wolff | July 8, 1941 |
| 2,271,876 | Seeley | Feb. 3, 1942 |
| 2,418,127 | Labin | Apr. 1, 1947 |
| 2,492,542 | Stone | Dec. 27, 1949 |
| 2,497,693 | Shea | Feb. 14, 1950 |
| 2,509,987 | Newman | May 30, 1950 |
| 2,552,588 | Reeves | May 15, 1951 |